United States Patent [19]

Holmes

[11] 4,329,627
[45] May 11, 1982

[54] HIGH FREQUENCY THYRISTOR CIRCUIT FOR ENERGIZING A GASEOUS DISCHARGE LAMP

[75] Inventor: Kenneth P. Holmes, Austin, Tex.

[73] Assignee: Esquire, Inc., New York, N.Y.

[21] Appl. No.: 148,008

[22] Filed: May 8, 1980

Related U.S. Application Data

[63] Continuation-in-part of Ser. No. 12,294, Feb. 15, 1979, which is a continuation of Ser. No. 773,287, Mar. 1, 1977, abandoned, which is a continuation-in-part of Ser. No. 700,222, Jul. 26, 1976, abandoned, which is a continuation-in-part of Ser. No. 654,926, Feb. 2, 1976, abandoned.

[51] Int. Cl.³ .................... H05B 37/02; H05B 39/04; H05B 41/36
[52] U.S. Cl. .................... 315/209 R; 315/DIG. 5; 315/DIG. 7; 315/207 SC; 323/320; 331/165; 331/117 R
[58] Field of Search ............. 315/209, DIG. 5, 209 R, 315/209 T, 209 SCR, DIG. 7; 331/117, 165, 166; 323/320, 330, 331

[56] References Cited

U.S. PATENT DOCUMENTS

| | | | |
|---|---|---|---|
| 3,226,655 | 12/1965 | Wilting | 331/117 X |
| 3,271,644 | 9/1966 | McShane | 331/117 X |
| 3,273,077 | 9/1966 | Camenzind | 331/117 X |
| 3,287,663 | 11/1966 | Steen | 331/117 X |
| 3,323,076 | 5/1967 | Pelly | 331/117 |
| 3,328,721 | 6/1967 | Hehenkamp et al. | 331/117 X |
| 3,368,164 | 2/1968 | Shapiro | 331/166 X |
| 3,534,243 | 10/1970 | Kondo et al. | 331/117 X |
| 3,663,895 | 5/1972 | Hochheiser et al. | 331/165 |
| 3,862,439 | 1/1975 | Coccio | 307/252 UA |

Primary Examiner—Saxfield Chatmon, Jr.
Attorney, Agent, or Firm—Frank S. Vaden, III; Emil J. Bednar

[57] ABSTRACT

A circuit for energizing a gaseous discharge lamp at high frequency utilizing a thyristor, preferably an SCR. The energizing circuit for the lamp includes a resonant or tank circuit operating at an appropriate high frequency, preferably above the acoustic resonant frequencies of the lamp, and which also commutates an SCR. The cathode/anode of the SCR is connected to a voltage adjusting network to provide an initiating pulse through the SCR to start oscillations in the resonant or tank circuit when the SCR is gated on and which reduces the applied supply potential to the SCR during its conduction period to ensure non-conductive latching of the SCR when the gate thereto is removed by lengthening the natural commutation interval of the SCR. This permits the SCR to be used as a switch at the high frequencies involved, normally about 60 kHz. The gate of the SCR is connected to a gate energizing/deenergizing network for abruptly rendering the SCR conductive and non-conductive, which network includes a pair of capacitive discharge circuits designed to sequentially place appropriate amounts and polarity of charge onto the gate of the SCR.

6 Claims, 6 Drawing Figures

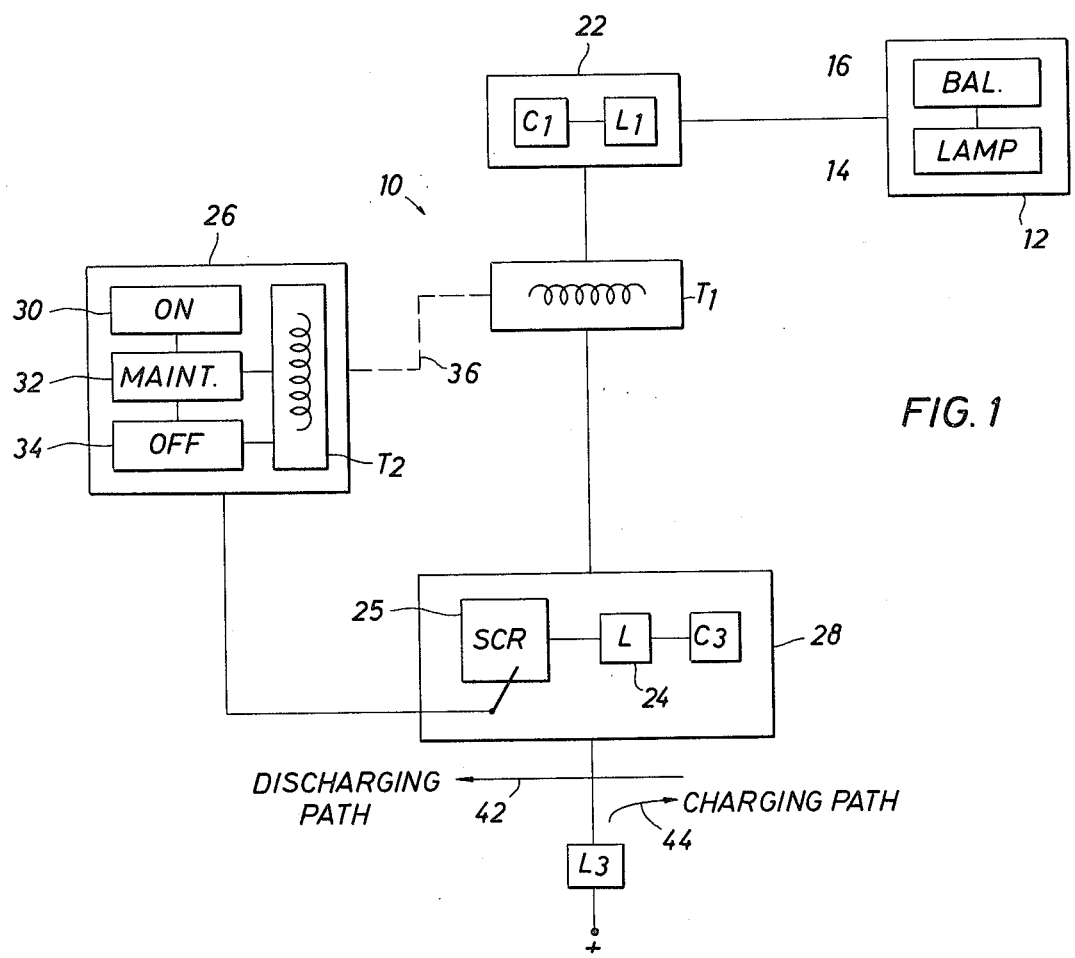
FIG. 1
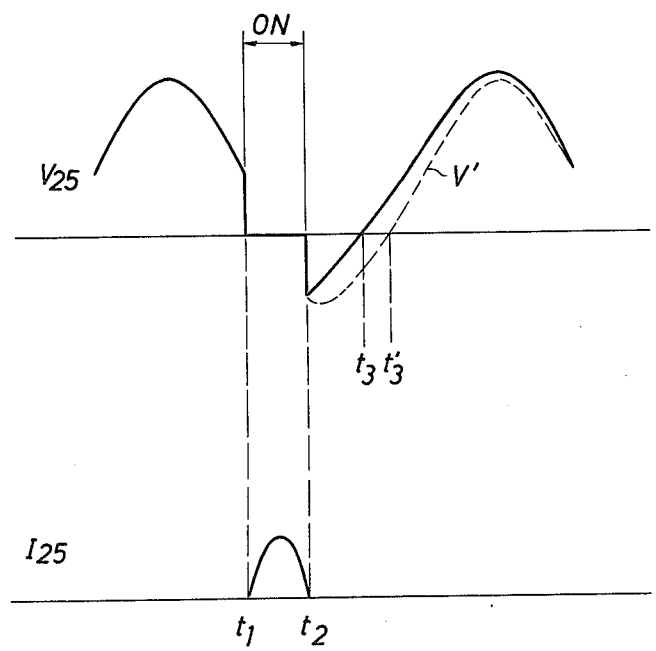
FIG. 2a
FIG. 2b

HIGH FREQUENCY THYRISTOR CIRCUIT FOR ENERGIZING A GASEOUS DISCHARGE LAMP

This application is a continuation-in-part of copending application Ser. No. 012,294, entitled "High Frequency Thyristor Circuit for Energizing a Gaseous Discharge Lamp", filed Feb. 15, 1979, which is a continuation of application Ser. No. 773,287, filed Mar. 1, 1977, now abandoned, which is a continuation-in-part of application Ser. No. 700,222, entitled "High Frequency Circuit for Operating a High-Intensity, Gaseous Discharge Lamp", filed July 26, 1976, now abandoned, which is a continuation-in-part of application Ser. No. 654,926, of the same title, filed Feb. 2, 1976, now abandoned, in favor of copending patent application Ser. No. 899,479, entitled "High Frequency Circuit for Operating a High-Intensity Gaseous Discharge Lamp", filed Apr. 24, 1978 and U.S. Pat. No. 4,134,044, of the same title.

BACKGROUND OF THE INVENTION

1. Field of the Invention

This invention relates generally to circuits for energizing gaseous discharge lamps at high frequency, and more specifically, to such circuits employing SCR-type thyristors.

2. Description of the Prior Art

Conventional ballasting circuits for gaseous discharge lamps are well-known for providing proper voltage for starting and limiting the current during operation. Such ballast circuits are usually large and relatively expensive and generally they are not efficient at low cost. Simple inductor ballasts are available; however, they provide poor regulation for line voltage variations.

Although regulating solid state ballasts have been developed, heretofore no commercial ballast circuits have been developed which are entirely suitable for operating gaseous discharge lamp at high frequency.

Theoretically a lamp may be operated either with ac or with a combination of applied dc and ac. Operation with pure ac has conventionally caused audible, oftentimes annoying noises. Combined ac and dc energization gives lower noise than ac alone, but the application of dc inhibits lamp efficiency and shortens life. The application of low audio frequency ac causes noisy ballast conditions. The application of medium frequency ac causes noisy and unstable lamp conditions. In this regard, the high pitch whine of lamps operated under such conditions can be extremely unpleasant.

It is not surprising, therefore, that there have been many proposals for operating gaseous discharge lamps, such as fluorescent lamps, at high frequency. Such previously proposed high frequency energizing circuits generally have utilized especially constructed transformers and coils and have utilized solid state switching devices. The solid state ballast circuits which have been developed, however, have not been for high frequency, such as well above 20 KHz, operation.

One drawback contributing towards the lack of development of a solid state ballast for operating at high frequency is that the characteristics of conventional transistors are less predictable at high frequency operation than for lower frequency operation. It is believed that thyristors, such as silicon controlled rectifiers or SCR's, have only rarely been utilized because of the finite minimum time during which the SCR drive must be reverse biased to assure latching of the SCR in the non-conductive state. Unless the gate and anode energization is removed for at least this minimum time, the SCR will conduct even without gate energization when a positive voltage is placed on its anode. As the frequency of operation increases and this minimum time becomes a greater and greater portion of the operating cycle, providing this minimum time for naturally commutating the SCR becomes increasingly difficult. Consequently the SCR's have historically been considered relatively low frequency devices.

Many of the advantages which are achieved by operating gaseous discharge lamp lighting systems at high frequency are well recognized. Lumen efficiency is generally acknowledged to increase for both fluorescent and high intensity discharge (HID) lamp systems at higher frequencies of operation. It has even been suggested to be desirable to operate fluorescent-type systems at 50 kHz. The rationale for operating fluorescent-type systems at 50 kHz is based on economic considerations, i.e., based on lamp-efficiency increase and the reduction in size and cost of ballast.

However, as is now understood, HID lamp systems operating at relatively high frequencies suffer from the phenomena of acoustic resonance. Whether fluorescent-type systems suffer from the acoustic resonance phenomena is unknown, but it is believed that such fluorescent systems do not so suffer.

Acoustic resonance is a physical resonating of the mechanical elements of the lamp which disturbs the flow of energy through the gaseous medium in the lamp. There are many frequency regions or bands of acoustic resonance in HID lamps, attempted operation in some of which so disturb the flow of energy within a lamp that the lamp extinguishes. Operating in other frequency regions merely causes a flickering of the lamp, producing unpleasant visual effects.

Prior art teachings in connection with acoustic resonance have suggested to many that HID lamp systems may be designed for operation between frequency bands of acoustic resonance. This suggestion has proven unsatisfactory in that the frequency bands are somewhat unpredictable according to the various mixtures of gases within the lamp and according to specific geometric considerations of the lamp. Furthermore, it has been reported that studies for some HID lamps indicate that stable points beyond certain frequencies, such as 4700 Hz, are difficult to find, i.e., the frequency bands of acoustic resonance become closer and closer together and are less predictable. It is believed that such teachings have steered the prior art away from operating HID lamps, or even characterizing the precise effects of acoustic resonance, at ultra high frequencies on the order of greater than 60 kHz.

By virtue of the present invention, on the other hand, it has been discovered that an ultra-high frequencies, the frequency bands of acoustic resonance become less and less visually distractive. Accordingly, above a certain frequency, it appears that acoustic resonance does not exist since it is not visually disturbing, nor does operation at such a frequency extinguish the lamp or cause undesirable and unpleasant flickering of light.

SUMMARY OF THE INVENTION

The above noted and other drawbacks of the prior art have been overcome by providing a thyristor switching circuit which is operable at ultra-high frequencies where problems attendant to acoustic resonance may effectively be disregarded, i.e., a thyristor energizing circuit for operating a gaseous discharge lamp above all acoustic resonant frequencies. To overcome the natural tendencies of thyristors to latch in the conductive state due to an insufficient period for natural commutation, a novel voltage adjusting circuit is featured in conjunction with the resonant or tank network employed to drive the lamp. Also featured is a novel gate energizing circuit which selectively generates well-defined positive energization pulses for timely abruptly forward biasing the thyristor gate. Furthermore, to insure that shifting of the phase angle of the potential resulting from the resonant tank operation, which operation also results in commutating the thyristor, does not allow the thyristor to latch in the conductive state, which would then most probably destroy the thryistor, the gate energizing circuit selectively produces an abrupt negative pulse to the gate of the thyristor upon decrease in the reference potential supplied to the gate energizing circuit, which reference potential is derived through a transformer action from the resonant tank circuit. The resonant tank circuit receives its initiating pulse for start of its oscillations from the thyristor and a reference potential derived from a voltage adjusting circuit.

The novel voltage adjusting circuit disclosed herein includes a capacitor which builds up to a predetermined value through an inductor and discharges through another inductor and thyristor at the time the thyristor is gated on to produce a shaped pulse for starting the tank circuit oscillations. The conduction of the thyristor reduces the magnitude of the reference potential applied thereto to prolong the natural commutating interval of the thyristor. This interval extension assures that the oscillations of the tank will not cause the thyristor to latch in when gate energizing is suspended by the oscillations being carried positive before the thyristor has a chance to turn off. The discharged capacitor provides the lowering of the reference potential for providing the extended period of natural commutation of the thyristor.

According to one aspect of the invention, a gate pulse generating circuit is provided for producing gate drive to the thyristor a delayed time following the initial application of power to the circuit and thereafter a delayed time after the SCR turn-off event of the previous resonating cycle. The ON network for gating the SCR includes a capacitor for producing the voltage, and when the capcitor voltage exceeds the predetermined level, the capacitor discharges to gate the thyristor.

According to another aspect of the invention, the gate pulse generating circuit further includes a MAINTAINING network for maintaining energization to the gate of the thyristor after the ON circuit has generated an initial gating pulse. The MAINTAINING circuit includes a capacitor and a slow recovery diode serially coupled to the gate of the thyristor.

According to yet another feature of the invention the gate pulse generating circuit includes an OFF network which is coupled in parallel with the capacitor of the MAINTAINING network. The OFF network selectively charges the capacitor to a relatively high value of a polarity which terminates the gate drive to the thyristor. Preferably the OFF network includes another capacitor serially coupled to a programmable unijunction transistor (PUT). The series connection of the capacitor and unijunction transistor is coupled in parallel with the capacitor of the MAINTAINING network to discharge the maintaining capacitor when the PUT is rendered conductive responsive to the peaking of the oscillation in the resonant circuit.

In the preferred embodiment, the thyristor is an SCR, the electric resonant tank circuit is an L-C tank circuit in parallel with an autotransformer, and the voltage adjusting circuit and the gate energizing circuit are of novel design discussed more fully hereinafter, all of which operate together to provide a new and improved thyristor switching system.

Accordingly, it is a general object of the present invention to provide a new and improved thyristor switching circuit for operating a gas discharge lamp at a high frequency, preferably above acoustic resonance.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings

FIG. 1 is a functional diagram of a thyristor switch circuit system which provides energization to a lamp load in accordance with the present invention.

FIGS. 2a-2b are illustrative wave forms for the circuit of FIG. 1.

DESCRIPTION OF THE PREFERRED EMBODIMENTS

Figure 3:
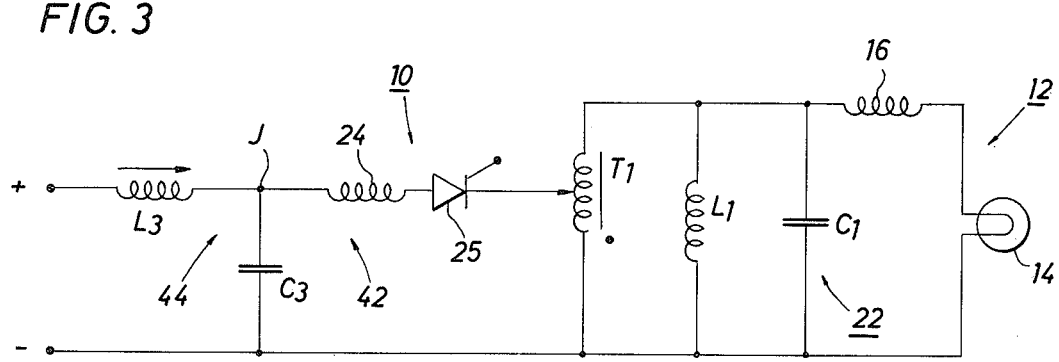
FIGS. 3 and 4 are embodiments of a resonant tank network and a voltage adjusting circuit utilized in the system of FIG. 1.

Referring to the drawings and first to FIG. 1, thyristor switch energizing system 10 is shown for providing high frequency energization to a load 12. Energizing system 10 includes a thyristor switch circuit and the load 12 is preferably a gaseous discharge lamp lighting system, although it may take the form of any of a variety of ac loads. As illustrated, load 12 is a gaseous discharge lamp 14 provided with a ballast 16 and is energized by system 10. Lamp 14 will be assumed to be a HID lamp, although a fluorescent lamp and other types of gaseous discharge lamps can also be driven with the system according to the invention. System 10 is especially adapted for energizing the HID lamp at a frequency above acoustic resonance, i.e., above approximately 60 kHz for most HID lamps, and preferably in the range of 60 kHz to 100 kHz. Depending on waveform characteristics of the energizing signal, the particular kind of lamp 14, and the geometric construction of the particular lamp 14, it has been found that one embodiment of a standard, 175-watt, metal halide lamp operates above acoustic resonance at 67 kHz.

In co-pending patent applications Ser. No. 654,926, filed Feb. 2, 1976, and Ser. No. 700,222, filed Feb. 26, 1976, both now abandoned as indicated above in favor of copending application Ser. No. 899,479, all filed in the name of Kenneth P. Holmes and assigned to the assignee of the present invention, several transistor circuits are shown for operating a gaseous discharge lamp system at high frequency. These circuits, as well as the circuit according to the present invention, are especially adapted for energizing a gaseous discharge lamp system at frequencies above acoustic resonance, i.e., at frequencies above the frequency ranges wherein acoustic resonance adversely affects the quality of the light emission and otherwise causes harmful effects; in still other words, at frequencies above the regions of acoustic resonance which either extinguish the lamp or undesirably cause noticeable flickering of the light emitted from the lamp. These patent applications Ser. Nos. 654,926, 700,222 and 899,479 are specifically incorporated in their entireties into the present application by reference.

Energizing system 10 includes a thyristor in the form of an SCR 25, an electric resonant network for driving the ballast and lamp load and for naturally commutating the SCR 25, and a charging/discharging group of components connected to thyristor 25 for initiating energy oscillations to resonant network 22 and for providing an adjustable reference potential to SCR 25 for assuring that it commutates on each cycle of oscillation of the resonant network. Thyristor 25 takes the form of a fast recovery silicon controlled rectifier (SCR) although other forms of thyristors such as ITR's or ASCR's may suitably be utilized according to the teachings of this invention. Although it is not shown, it is understood that a conventional R-C snubber circuit is connected across SCR 25. Resonant network 22 provides a commutating signal through autotransformer T1 to SCR 25 for naturally commutating it.

Voltage adjusting network 28 shown comprises capacitor C3 and inductor 24 in series combination with the cathode/anode network of SCR 25. Preferably inductor L3 provides the charging path for capacitor C3 from a positive voltage supply. When SCR 25 is gated on, the discharge path for capacitor C3 is through inductor 24 and, thence, through SCR 25. Inductor 24 is a feature of the present invention. Because of its association with capacitor C3, as well as with resonant network 22, the current applied to SCR 25 is caused to be somewhat sinusoidal. This wave shaping of the energy waveform applied to the SCR reduces losses in the SCR and causes less stress to be placed on the SCR during operation.

Energizing system 10 further includes a gate energizing or pulse generating system 26 for providing hard control to the gate of SCR 25. Gate energizing network 26 operates with voltage adjusting circuit 28 by providing gate drive or energization to SCR 25, which voltage adjusting circuit 28 selectively modifies the reference potential applied to resonant network 22 for initiating oscillations therein and then extending the period of natural commutation of the SCR 25. By modifying the reference potential applied to resonant network 22, SCR 25 can be operated at ultra-high frequencies, on the order of greater than 60 kHz, without the risks that SCR 25 may latch into the conductive state due to an insufficient period of gate drive removal.

The gate pulse generating circuit 26 features an ON network 30, a MAINTAINING network 32, and an OFF network 34. The ON network generates an abrupt, well defined pulse to the gate of SCR 25 for initially rendering SCR 25 conductive. In response to operation of resonating circuit 22 via coupling 36, MAINTAINING network 32 provides further gate drive to SCR 25 after the expiration of the pulse from ON network 30. Networks 30 and 32 maintain SCR 25 conductive for a small part of the positive half cycle operation of resonant network 22, as will be explained hereinbelow.

In more detail and referring to FIGS. 2a-2b, the resonant network 22 is illustrated as initially resonating, thereby providing a voltage waveform (FIG. 2a) on the anode of SCR 25. When ON network 30 generates its pulse on the gate of SCR 25, SCR 25 is rendered conductive, allowing current (FIG. 2b) to flow through SCR 25 and to cause a substantially zero voltage drop across the SCR during time periods $t_1$-$t_2$. At the end of the period of conduction at time $t_2$, current in the inductor 24 connected in series with the anode of SCR 25 stops flowing, causing a negative voltage excursion (FIG. 2a) on the anode of the SCR 25. As the voltage on the anode of SCR 25 increases in response to resonant network 22, the SCR latches into the non-conductive state if its minimum period required for natural commutation is less than the period $t_2$-$t_3$.

As the frequency of the resonant network increases, however, the period $t_2$-$t_3$ becomes shorter and shorter, approaching the minimum period required for natural commutation. To prevent this, the action of voltage adjusting circuit 28 lowers the potential applied to the anode of SCR 25 during conduction of SCR 25 so that when SCR 25 becomes non-conductive, resonant network 22 is then operating with respect to a lowered reference potential. This is shown by the dotted waveform denoted V' in FIG. 2a. As is seen, lowering of the potential provides an added period, $t_3$-$t_3'$, for increasing the period or interval during which SCR 25 may latch into the non-conductive state before the voltage oscillations on the anode of SCR 25 from resonant network 22 is carried positive, thereby potentially damaging the SCR.

To effect the lowering of the threshold applied to resonating circuit 22, voltage adjusting circuit 28 includes a discharge path 42 and charge path 44. An energy storage device in the form of capacitor C3, for example, is charged via path 44 and allows a substantially full reference potential to be applied to the resonating circuit 22 at time $t_1$. Upon conduction of SCR 25, the energy storage element discharges via the discharge path 42, causing a reduced amplitude reference potential to be applied to resonating circuit 22 at $t_2$.

A further explanation of the waveforms shown in FIGS. 2a-2b is set forth below with respect to the detail operation of the exemplary circuits described hereinafter.

Referring now to FIG. 3, a preferred embodiment of energizing system 10 and load 12, except for the gate pulse generating circuit 26, are shown in detail. Resonant network 22 includes an L-C tank circuit comprising the parallel connection of an inductor L1 and a capacitor C1. This tank circuit is coupled to the secondary of an autotransformer T1 and is coupled across ballast 16 and lamp 14. The primary of transformer T1 is connected to the cathode of SCR 25 which, in turn, is connected by its anode to inductor 24. Inductor 24 is connected to a junction J, which is the common connection of an inductor L3 and a capacitor C3. Inductor L3 is connected to a reference positive potential and, in combination with the capacitor C3, forms charge path 44. Capacitor C3, inductor 24, SCR 25, and the primary winding of transformer T1 forms discharge path 42.

In operation, capacitor C3 is charged during non-conduction of the SCR 25 through inductor L3. Inductor L3 assists in the charging by allowing the capacitor C3 to become essentially fully charged. When SCR 25 is rendered conductive, capacitor C3 discharges through SCR 25, causing a current pulse to be applied to the tank circuit. Because of the reduced voltage on capacitor C3, SCR 25 has increased time for latching into the non-conductive state via natural commutation. Operation of the gate pulse generating or energizing circuit 26 is described subsequently in connection with FIG. 5.

Figure 4:
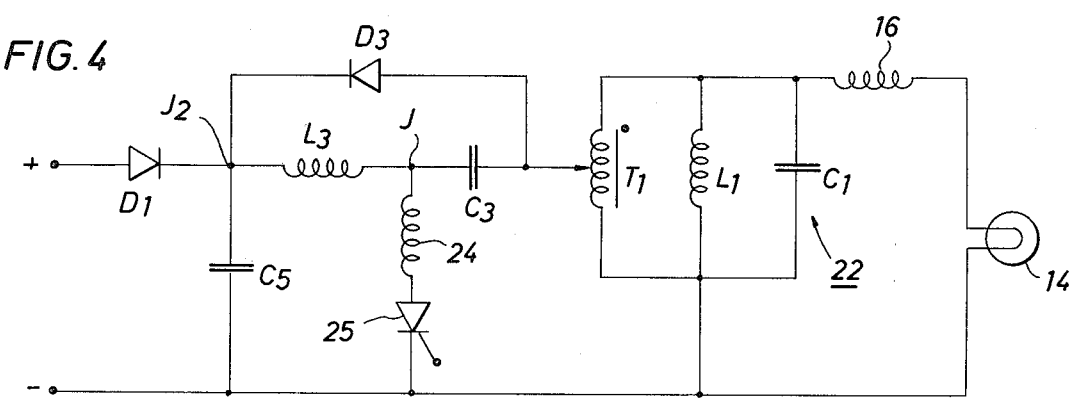

Referring now to FIG. 4, another embodiment of a voltage adjusting circuit is shown, which circuit does not impose dc into the transformer T1, thereby obviating inefficient operation due to heat loss. Elements in FIG. 4 which are functionally like the elements in FIG. 3 have been assigned like referenced numerals.

As in FIG. 3, resonant network 22 is comprised of a tank circuit having the parallel combination of inductor L1 and capacitor C1 connected to the secondary of transformer T1. In its circuit, however, the terminals of the capacitor C3 and SCR 25 remote from their common junction J are interchanged, i.e., capacitor C3 is connected to the primary terminal of transformer T1 and the cathode of SCR 25 is connected to a neutral potential, nominally ground. Additionally, a protection diode D1 is interposed between the "+" reference potential and inductor L3, thereby defining a junction J2. A filter capacitor C5 is connected to junction J2 and to the "−" reference potential, and an overvoltage diode D3 is connected with its cathode to junction J2 and its anode to the primary of the transformer T1.

Charge path 44 now includes inductor L3 and capacitor C3 operating against the primary of transformer T1. Discharge path 42 includes capacitor C3, inductor 24, and SCR 25, which produces a current pulse in the primary winding of transformer T1.

In operation, capacitor C3 charges during non-conduction of SCR 25. When SCR 25 is rendered conductive, capacitor C3 discharges through the SCR 25, causing a current pulse to be applied to the primary and, thence, through transformer action, on the secondary of transformer T1. Because of the reduced voltage on capacitor C3, there is an increase of the period for natural commutation during which SCR 25 may latch into non-conduction.

Diode D3 is included as a feature which prevents component failures because of being over-driven resulting from brief periods of excessive tank voltage. Diode D3 clamps the primary of transformer T1 to a voltage difference of one diode potential above the voltage at junction J2, which, in turn, is one diode drop, caused by diode D1, below the "+" reference potential. When lamp 14 is in an extraordinarily low impedance state, for example, resulting from a lamp failure or during warm up, diode D3 prevents excessive voltage from being applied to the secondary of transformer T1.

Figure 5:
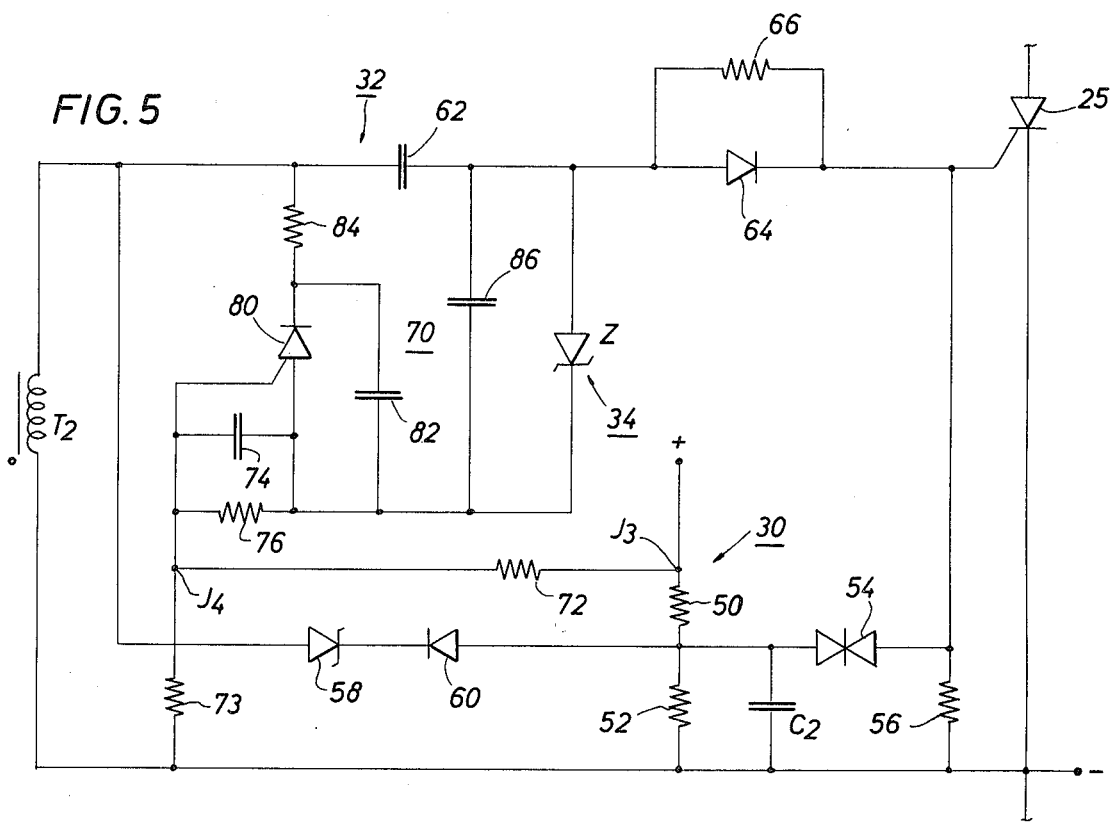
FIG. 5 is a schematic diagram detailing a preferred embodiment of an ON network, a MAINTAINING network and an OFF network, utilized in the circuit of FIG. 1 for providing gate drive to the thyristor.

Referring now to FIG. 5, the gate pulse generating or energizing circuit 26 comprising ON network 30, is shown in detail. ON circuit 30 includes a pair of serially connected resistors 50 and 52 defining a junction J3 at the high side thereof which couples the "+" reference potential to the "−" reference potential. A capacitor C2 is connected in parallel with resistor 52, and a diac 54 has one of its terminals connected to their common junction. The other terminal of diac 54 is connected to a gate-to-cathode shunt resistor 56 of SCR 25. A Zener diode 58 and a series diode 60 serially couple one terminal of a feed-back winding T2 of the transformer, which includes autotransformer T1, to the junction point between resistors 50 and 52.

The same terminal of feedback winding T2 is connected to MAINTAINING circuit 32. Diode 60 has its anode connected to junction J3 through resistor 50, and the cathode of Zener diode 58 is coupled to the cathode of diode 60.

Operation of the ON circuit is as follows. When the "+" reference potential appears (for example, at the time the on/off switch for the system is operated), capacitor C2 is charged by voltage divider action of resistors 50 and 52. When capacitor C2 exceeds the diac 54 voltage (for example, on the order of 32 volts), capacitor 52 is abruptly discharged into resistor 56 for forward biasing the gate of SCR 25. SCR 25 conducts current from capacitor C3, which imposes a pulse of current into resonating circuit 22. This causes the charge on capacitor C1 to build up, and hence voltage to build up in the same direction on winding T1, connected in parallel with capacitor C1. This, in turn, causes winding T2 to build up in accordance with the polarizing signs on the respective windings.

During this time period, which is the first half of the first half cycle of oscillation in resonating circuit 22, winding T2 is supplying gate drive as follows: a capacitor 62 and the parallel combination of a slow recovery diode 64 and shunt resistor 66, all of which combine to comprise the MAINTAINING network, are serially connected between winding T2 and the gate of SCR 25. Diode 64 has its cathode connected to the gate and has its anode connected to capacitor 62, which, in turn, is connected to winding T2. During the portion of time in which voltage across winding T2 is increasing due to pulsing of the SCR, gate drive is being supplied through the capacitor 62/diode 64/resistor 66 combination.

After one quarter of a cycle of resonating circuit 22 has been completed, the rate of change of the voltage, or the dv/dt of the voltage waveform, in resonating circuit 22 is equal to zero, as is the dv/dt of the voltage on winding T2. Thus, winding T2 is supplying no gate current into SCR 25. At this point, capacitor C3 in discharge path 42 has discharged to a relatively small voltage, and SCR 25 is being reversed biased and rendered non-conductive. As the tank voltage continues to swing in the second part of the first half cycle and returns to zero volts, the polarity on winding T2 reverses and extracts current from the gate of SCR 25 via the capacitor 62/diode 64/resistor 66 combination.

When the tank voltage begins the second half cycle, the polarity of winding T2 causes further decreasing of the voltage on capacitor C2, fully disabling diac 54. Accordingly, there is reverse gate drive being applied during the time period depicted in FIG. 2a as $t_2$-$t_3'$. During the last portion of the negative half cycle, capacitor C3 in charge loop 44 is becoming charged, ready for the next cycle.

Thus, for every first, third, fifth, etc., half cycle, capacitor 62 and slow recovery diode 64 are maintaining the gate of the SCR 25 for rendering it conductive after the initial pulsing provided the gate by the ON network described above. These components also assist with helping to extract the gate drive at precisely the right moments for rendering the SCR non-conductive, as described below.

The values of the various resistors and capacitors are selected such that the voltage on capacitor C2 is pulled low much more rapidly than it can be charged, thereby allowing diac 54 to pulse only once to start oscillations.

OFF circuit 34 is also shown in detail in FIG. 5 and includes an energy loop 70 which is connected to a junction J4 by the parallel combination of a capacitor 74 and a resistor 76. OFF circuit 34 further includes resistors 72 and 73, respectively connecting junction J4 to the "+" and "−" reference potentials. Energy loop 70 is connected in parallel with capacitor 62 and selectively superimposes a large charge onto capacitor 62 for abruptly reverse biasing the gate of SCR 25. Energy loop 70 includes an energy storage element described hereinafter, which becomes charged during normal operation of system 10 and which discharges into capacitor 62 upon lowering of the reference potential.

Energy loop 70 includes a programmable unijunction transistor (PUT) 80 having a capacitor 82 connected in parallel with it. The cathode of PUT 80 is connected by a resistor 84 to the common connection of winding T2 and capacitor 62. A capacitor 86 serves as the above-referenced energy storage element and connects the common junction of capacitor 62 and diode 64 with the anode of PUT 80. A Zener diode Z is connected in parallel with capacitor 86.

The capacitor 74/resistor 76 combination is connected between the gate and the anode of programmable unijunction transistor 80 and defines the voltage differential necessary for rendering PUT 80 conductive.

In operation, during normal operating of system 10, capacitor 86 is charged through junction J4. PUT 80 is non-conductive due to the particular steady state voltage differential established by the capacitor 74/resistor 76 combination. However, upon a decrease in the value of the reference potential to cause lowering of the voltage at junction J4, the gate voltage of PUT 80 decreases while the anode voltage tends to remain high due to the presence of capacitor 86. This renders PUT 80 conductive, allowing abrupt discharge of capacitor 86 into capacitor 62. Typically, capacitor 86 acquires a charge on the order of 36 volts, which becomes superimposed upon the voltage of capacitor 62, which exhibits a voltage range less than that, for example, from 5 to 20 volts. Accordingly, a relatively abrupt back biasing pulse is applied to the gate of SCR 25 whenever a sufficient decrease in the reference potential at junction J4 occurs.

OFF network 34, just described, is an important feature in that it assures rendering SCR 25 non-conductive before the period for natural commutation becomes less than that required. Otherwise, SCR 25 could latch into the conductive state. If utilized in a multiload system, this condition could essentially place a short circuit (the conductive SCR) across the reference potential, allowing a potentially destructive amount of current through the SCR.

Referring again to FIGS. 2a and 2b, the operation of the related circuits with respect to SCR 25 can now be better understood in detail. The voltage on the anode with respect to the cathode of the SCR is shown in FIG. 2a. The ON pulse is for only part of the time of the current marked $I_{25}$ in FIG. 2b. The effect of the ON pulse is seen by the vertical voltage drop at time $t_1$ of FIG. 2a. The complete time of current flow from $t_1$-$t_2$ is initially caused by the ON network, but, thereafter, for most of the period, current is allowed to flow because the SCR has latched on.

At time $t_2$, the SCR has begun blocking voltage in the reverse direction, as reflected in the appearance of a negative voltage on the anode of the SCR at the time of negative gate biasing. Were it not for the discharging of capacitor C3 during the conduction of the SCR, the voltage would be at the solid line nadir shown in FIG. 2a and the oscillations in resonant network 22 would cause the voltage to rise back along the solid line therefrom. When the solid line intersects zero, at time $t_3$, the SCR would conduct even without the presence of an applied gate if the non-conduction time for the SCR were too short. This would be destructive of the SCR.

What actually happens is that the capacitor discharging lowers or makes more negative the voltage on the anode of the SCR so that the reference voltage potential is with respect to the dashed line marked V'. Since this line starts up from a more negative point than for the solid line, the time to zero intersection is prolonged to time $t_3'$. This prolongation of the interval from $t_3$ to $t_3'$ assures that the SCR will have time to non-conductively latch before the anode voltage becomes positive through the action of oscillations in the resonant circuit.

Thus, it will be apparent that a new and improved thyristor switching circuit has been described. Please note that although the explanation has been with regard an SCR, a uni-directional thyristor, the operation is not limited to uni-directional operation and, therefore, bidirectional thyristors may be operated in the same or similar manner, as well. It is capable of operating at ultra-high frequencies, on the order of greater than 60 kHz, and is especially suited for energizing gaseous discharge lamps, include HID lamps. A novel and improved voltage adjusting circuit and gate pulse generating or energizing circuit have been described for enabling the high frequency operation of the thyristor.

Although rather detailed embodiments have been described, it is understood that they have been provided by way of example only. Various modifications to the specific embodiment will be apparent to those having ordinary skill in the art without departing from the spirit and the scope of the invention.

What is claimed is:

1. A circuit for generating a high frequency signal to a load, comprising
    a resonating circuit connected to the load,
    a thyristor connected to the resonating circuit such that when said thyristor is gated on, the resonating circuit naturally commutates said thyristor at a natural commutation interval,
    a voltage adjusting circuit connected to said thyristor for providing energy to said resonating circuit when said thyristor is gated on to initiate oscillations in said resonant circuit for driving the load at high frequency,
    said energy to said resonating circuit being a pulse,
    said voltage adjusting circuit also providing a potential to said thyristor which changes to a lower value after said thyristor is gated on to thereby ensure non-conductive latching of said thyristor by lengthening said natural commutation interval, and
    gate energizing means for abruptly forward biasing the gate of said thyristor for turn on thereof, and abruptly negatively biasing the gate of said thyristor following reversal of the rate that said pulse changes from a rising pulse to a declining pulse.

2. A circuit in accordance with claim 1, wherein said gate energization means includes a capacitor charged by a voltage source, and a bidirectional semiconductor device connected to said capacitor and to the gate of said thyristor, such that a predetermined charge on said capacitor causes conduction of said semiconductor device and gating on of said thyristor.

3. A circuit in accordance with claim 1, wherein said gate energization means includes maintaining means for applying a gate energizing voltage to said thyristor following the initiating of abrupt forward biasing and preceding the initiation of abrupt negative biasing.

4. A circuit in accordance with claim 3, wherein said maintaining means includes a transformer winding coupled to said resonant circuit and a capacitor connected to the gate of said thyristor, said capacitor being charged by said inductor when said resonant circuit is in oscillation so as to maintain a forward gate bias on the gate of said thyristor.

5. A circuit in accordance with claim 4, wherein said gate energization means includes means for discharging said capacitor of said maintaining means and negatively biasing the gate of said thyristor.

6. A circuit in accordance with claim 5, wherein said discharging means includes a programmable unijunction transistor connected to the side of said first named capacitor opposite from the connection thereof to the gate of said thyristor, a second capacitor connected to the other side of said first named capacitor and to the anode of said programmable unijunction transistor, the gate of said programmable unijunction transistor being connected to said transformer winding coupled to said resonating circuit so that when there is a lessening of potential in said transformer winding resulting from its inductive coupling, the potential on the gate of the programmable unijunction transistor reduces in comparison with its anode causing its conduction and discharging said first named capacitor to abruptly reverse bias the gate of said thyristor.

* * * * *